Patented Aug. 14, 1923.

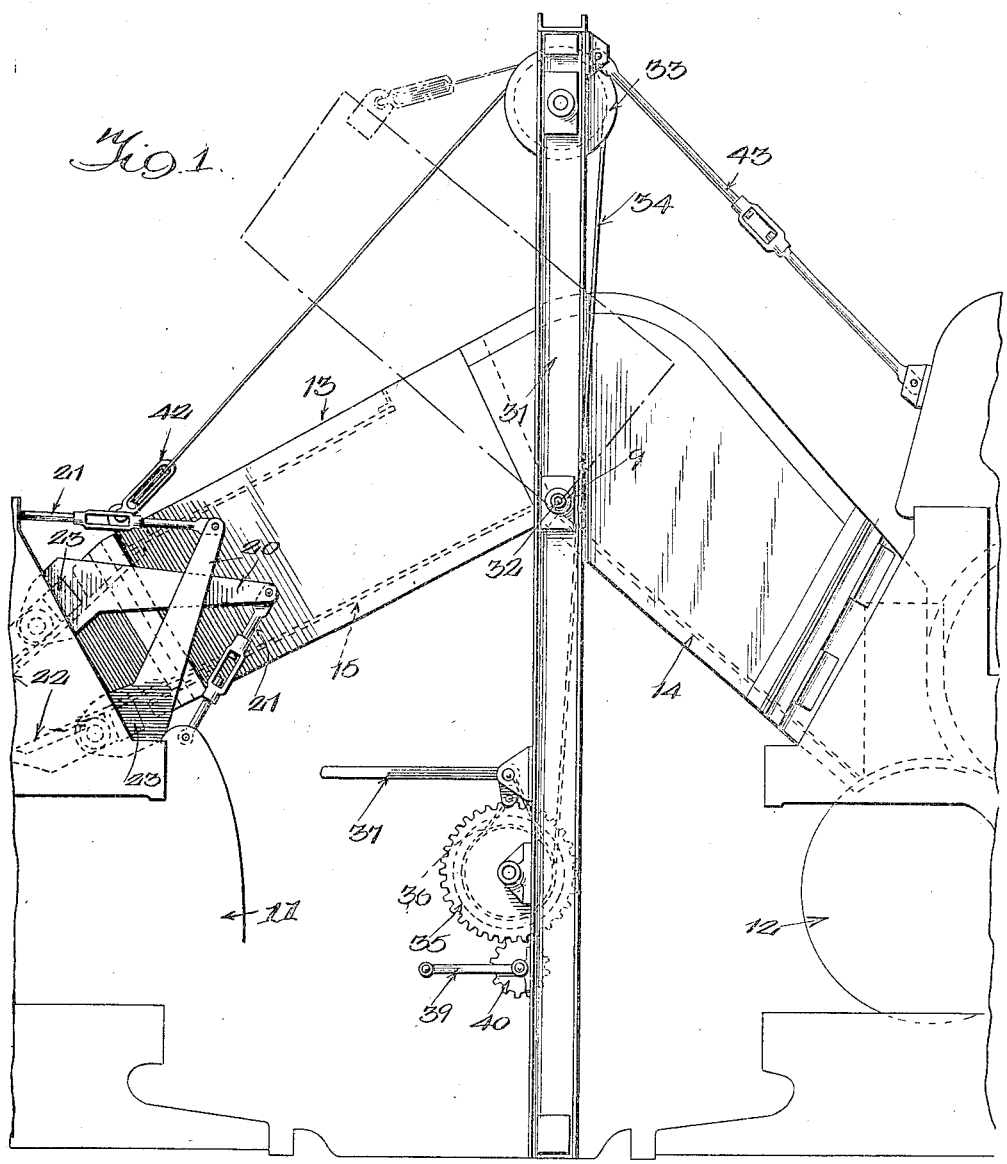

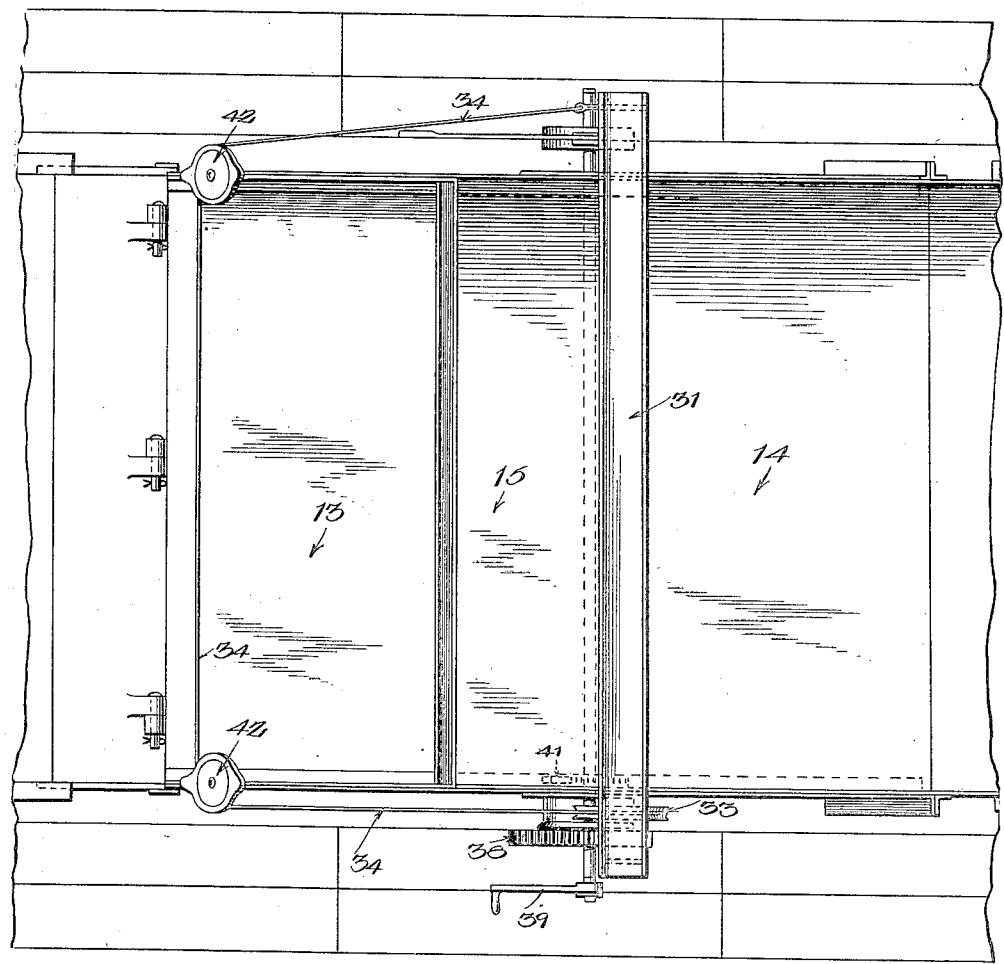
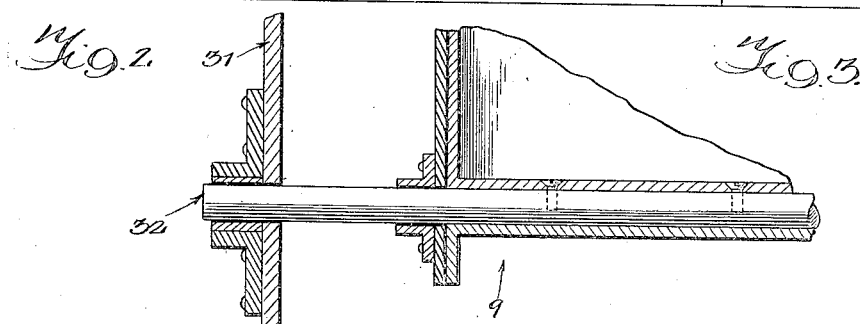

1,464,914

UNITED STATES PATENT OFFICE.

JOSEPH MEINECKE, OF PAIA MAUI, TERRITORY OF HAWAII, ASSIGNOR OF ONE-HALF TO W. A. RAMSAY, OF HONOLULU, TERRITORY OF HAWAII.

APPARATUS FOR CLEARING INTERMEDIATE FEED CHUTES.

Application filed March 23, 1922. Serial No. 546,196.

*To all whom it may concern:*

Be it known that I, JOSEPH MEINECKE, a citizen of the United States, and a resident of Paia Maui, Territory of Hawaii, have invented certain new and useful Improvements in Apparatus for Clearing Intermediate Feed Chutes, of which the following is a specification.

My invention relates to improvements in cane sugar mills and it consists in the constructions, combinations and mode of operation herein described and claimed.

An object of the invention is to provide an intermediate chute to be disposed between adjacent mills, including two inclined portions, one of which is hinged at the summit so that it may be tilted for the purpose of clearing the chute.

Other objects and advantages will appear in the following specification, reference being had to the accompanying drawings, in which:—

Fig. 1 is a side elevation showing the hinged part of the intermediate chute raised into the dotted line position to illustrate the clearing action, Fig. 2 is a plan view, and Fig. 3 is a detail section on line 3—3 of Fig. 2.

This invention is an improvement on the intermediate chute of the cane sugar mill disclosed in my co-pending application for Letters Patent filed July 7, 1920, Serial No. 394,456. Briefly described, the old structure comprises a chute generally designated 13. The chute extends between adjacent macerating mills 11 and 12. It has oppositely inclined portions which meet at the summit 9.

The receiving portion 15 is of less inclination than the discharge portion 14. The receiving portion 15 has scrapers 22 which engage the discharge sides of the macerating rolls 11 so as to clean the surfaces of adhering material.

Bars 23 carry the scrapers 22. These bars also carry levers 20 which are adjustable by means of the turnbuckle rods 21. The scrapers are set in respect to the macerating rolls 11 by adjusting the turnbuckles.

The improvement comprises standards 31 which support the chute portion 14 and to which the chute portion 15 is hinged at 32. The standards carry a sheave 33 near the upper end of one. The strand of a wire rope 34 passes over this sheave and is fastened at the upper end of the other standard.

The other end of the wire rope 34 is fastened to a drum 35 which is wide enough to accommodate a brake band 36. This band is actuated by a lever 37. The drum has a gear 38 which is turned by means of the crank 39 and pinion 40. A pawl and ratchet 41 checks the drum 35 from counter rotation when the chute portion 15 has been elevated into the dotted line position in Fig. 1.

The bight of the rope 34 passes through sheaves 42 which are suitably affixed to the sides of the chute portion 15 near the forward end. The standards 31 are braced by tie rods 43. The upper free ends of the sides of the chute 15 are overlapped by the sides of the chute 14. This arrangement prevents leakage while the bagasse passes upwardly and toward the right in the chute portion 15.

The purpose of the improvement is obvious. There are times when the sugar mills must be shut down, and at such times it is desirable and necessary to clear the intermediate chute 13. This is effectually done by elevating the receiving side 15 in the dotted line position so that all materials adhering to the bottoms and sides (and which would otherwise run back into the mill 11) may gravitate into the discharge side 14 where it will run into the mill 12 but from which it can be readily removed.

Fig. 3 plainly shows the arrangement carried out at the hinge 32. This hinge comprises a rod on which the chute portions are supported. The inner chute 15 is fastened to the rod as shown. The outer chute 14 has bearing on the same rod, so that the rod may easily turn in respect to the chute 14 which is fixed. The rod in turn has bearing on the end standards.

I claim:—

1. In combination with adjacent sugar cane mills, a sectional chute for conveying bagasse from one to the other, and means for tilting one section in respect to the other to cause the bagasse to gravitate toward the other section and clear the chute when shutting down the mills.

2. A chute for conveying bagasse from one mill to another comprising a fixed part, and an associated part which is movable in respect to the fixed part to cause material adhering thereto to gravitate toward said fixed part.

3. An intermediate chute comprising oppositely inclined portions, and means for tilting one portion in respect to the other to cause the gravitation of material from the tilted one to the other.

4. An intermediate chute comprising oppositely inclined portions, means by which the chute is supported at the summit, means by which the chute is mounted on the supporting means at the summit, and means by which one portion is moved on the mounting means to tilt it in respect to the other portion for the gravitation of material thereinto.

5. An intermediate chute comprising an inclined portion which is movable and has sides, and another portion which is stationary and also has sides which overlap those of the movable portion to prevent leakage from bagasse in moving from the movable portion to the fixed portion.

6. An intermediate chute comprising a portion which is movable and has sides, a portion which is fixed also having sides between which those of the movable portion operate, and means by which said movable portion is operated.

7. An intermediate chute comprising a pair of standards, a pivot running across, a chute portion fixed on the pivot between the standards, a second chute portion movably mounted on the pivot, and means carried by the standards for rocking the movable portion on the pivot and in respect to the fixed chute portion.

8. An intermediate chute comprising a pair of standards, a pivot running across, a chute portion fixed on the pivot between the standards, a second chute portion movably mounted on the pivot, means carried by the standards for rocking the movable portion on the pivot to bring it into line with the fixed chute portion, and brake, pawl and ratchet devices associated with said moving means for controlling the movement of said movable chute portion.

9. An intermediate chute comprising standards, a pivot extending from one standard to another, a chute comprising one portion which is fixed on the pivot, a second portion movably mounted on the pivot, a sheave carried by the movable portion, a sheave carried by the standard structure, a cable applied to the sheaves and having connection at one end with the standard structure, a drum on the standard structure for winding the cable at the other end, and brake means for controlling the operation of the drum.

10. In combination with adjacent sugar cane mills, a standard structure erected between the two, bracing means between the mills and standard structure to brace the latter, a chute consisting of sections extending from the respective mills toward the standard structure and disposed at angles in respect to the mills, the standard structure and each other, means on the standard structure upon which one section is fixed and upon which the other section is movable, and means carried by the standard structure in connection with said movable section for shifting it from the adjacent mills and in respect to the companion fixed chute section.

JOSEPH MEINECKE.